United States Patent [19]
Wolda

[11] Patent Number: 5,988,724
[45] Date of Patent: Nov. 23, 1999

[54] TAILGATE HINGE MECHANISM

[76] Inventor: Tiete O. Wolda, 12 Perriville Crescent, Scarborough Ontario, Canada, M1J 2C1

[21] Appl. No.: 08/911,966

[22] Filed: Aug. 15, 1997

[51] Int. Cl.⁶ .................................................. B62D 25/00
[52] U.S. Cl. ............................... 296/57.1; 16/308; 49/386
[58] Field of Search ......................... 296/57.1, 59, 146.1, 296/106, 146.8; 16/308; 49/386

[56] References Cited

U.S. PATENT DOCUMENTS

| | | | |
|---|---|---|---|
| D. 370,453 | 6/1996 | Shortman et al. | D12/223 |
| 2,395,456 | 2/1946 | Bunker | 16/308 |
| 2,733,476 | 2/1956 | Eck | 16/180 |
| 2,799,891 | 7/1957 | Ragsdale | 16/308 |
| 2,810,153 | 10/1957 | Semar | 16/180 |
| 2,984,517 | 5/1961 | Farrow et al. | 296/57 |
| 3,031,225 | 4/1962 | Saffer et al. | 296/57.1 |
| 3,085,286 | 4/1963 | Whitehouse et al. | 16/180 |
| 3,122,775 | 3/1964 | Pulleyblank | 16/308 |
| 3,166,783 | 1/1965 | Mackie et al. | 16/163 |
| 3,336,070 | 8/1967 | Jackson | 296/57.1 |
| 3,370,317 | 2/1968 | Marchione | 16/308 |
| 3,402,508 | 9/1968 | Kessler | 49/386 |
| 3,643,378 | 2/1972 | Velavicius et al. | 49/445 |
| 3,649,067 | 3/1972 | Louton | 296/50 |
| 3,695,678 | 10/1972 | Gergoe | 296/76 |
| 3,699,716 | 10/1972 | Wanlass | 49/40 |
| 4,143,904 | 3/1979 | Cooper et al. | 296/57 |
| 4,291,501 | 9/1981 | Steinberg et al. | 49/386 |
| 4,378,658 | 4/1983 | DeLorean | 49/379 |
| 4,701,977 | 10/1987 | Hori et al. | 16/266 |
| 5,039,154 | 8/1991 | Lewis | 296/52 |
| 5,358,301 | 10/1994 | Konchan et al. | 296/146.1 |
| 5,641,262 | 6/1997 | Dunlop et al. | 414/557 |
| 5,787,549 | 8/1998 | Soderlund | 16/308 |

Primary Examiner—D. Glenn Dayoan
Assistant Examiner—Paul Chenevert
Attorney, Agent, or Firm—Brooks & Kushman P.C.

[57] ABSTRACT

Tailgate hinge mechanism mounting the tailgate for swingable movement between closed, open and removal positions is designed to allow incorporation of a torque rod which cooperates with the hinge mechanism to assist in opening or closing the tailgate and yet is not a required portion of the hinge mechanism, but if desired may be quickly and easily installed as a unitary mechanism.

9 Claims, 3 Drawing Sheets

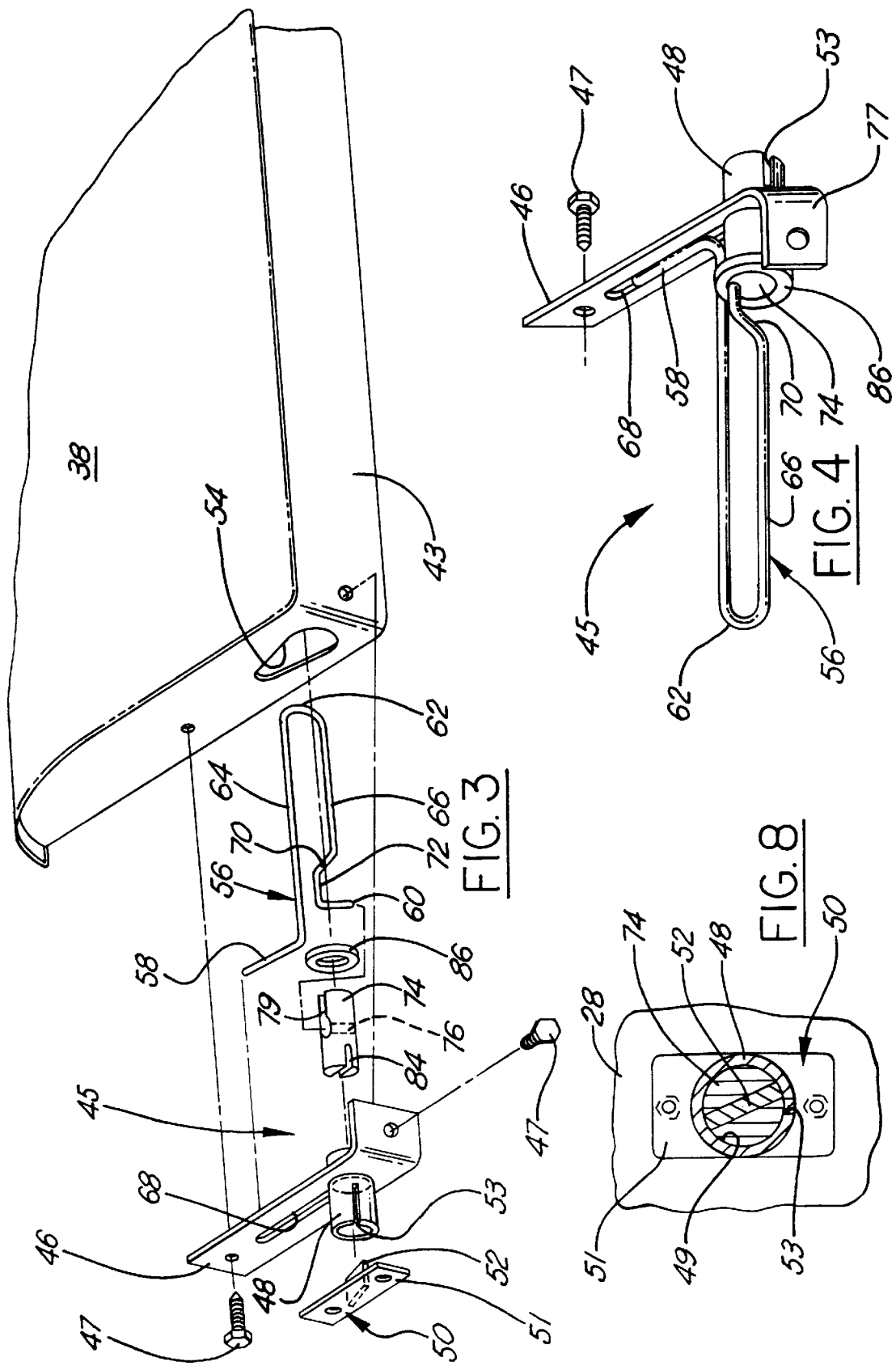

TAILGATE HINGE MECHANISM

TECHNICAL FIELD

The present invention relates generally to removable tailgates for pickup trucks or the like and, in particular, to a mechanism for removably mounting a tailgate which optionally permits the inclusion of a torque rod for assisting in opening and closing the tailgate.

BACKGROUND ART

Vehicles, such as trucks and station wagons, have a closure member, such as a tailgate, pivotally mounted between body side panels at the rear of the vehicle. The closure member pivots about a hinge axis between horizontally open and vertically closed positions. For instance, in a truck, a tailgate in the closed or up position serves as the rear wall of the cargo bed of the truck. In the open or down position, the tailgate is out of the way to enable loading and unloading of the cargo bed.

Typically, tailgates may be removed from trucks with quick connection fittings. Usually, the quick connection fittings are designed so that the tailgate is removable from the truck when the tailgate is pivoted to a partially open tailgate removal position. For example, the tailgate may include hinge pins extending outwardly along the hinge axis. The hinge pins removably connect into journals mounted on brackets carried on the truck body. When the tailgate is pivoted to the tailgate removal position, at least one of the hinge pins slips through a slot in the connecting journal as the tailgate is lifted at one end from the truck body.

For some operators, handling the weight of the tailgate during opening and closing movements may be too much of a burden. Trucks are becoming more popular with a wider audience of operators than ever before. Operators of all sizes and shapes and both genders use and enjoy trucks. Accordingly, it is advantageous to provide an assist device which may be installed in a pivotable tailgate for assisting in opening and closing the tailgate while permitting quick removal of the tailgate from the truck body.

U.S. Pat. No. 5,358,301 ("the '301 patent") discloses a counterbalance mechanism for a removable tailgate which assists with opening and closing the tailgate while permitting removal of the tailgate from a truck body. The counterbalance mechanism includes a torque rod having a crank end anchored to the tailgate for pivotal movement therewith and a stationary end. A receptacle mounted on the truck body captures the stationary end of the torque rod to restrain pivotal movement thereof. When the tailgate is moved away from a tailgate removal position, the torque rod is torsionally wound and urges the tailgate back towards the removal position. The receptacle captures the stationary end with a releasable slip-fitted connection to permit the tailgate and the torque rod to be removed from the truck body.

A primary disadvantage associated with the '301 patent is that in the various embodiments disclosed therein either the tailgate pivots on the torque rod itself or an end of the torque rod must be aligned with a receptacle on the truck body at the same time as the pivot pins at opposite sides of the tailgate are being aligned with the trunions on the vehicle body. In the first case, the torque rod is an essential component providing the pivotal connection between the tailgate and the truck body and thus is not an option. In short, instead of using hinge pins or shafts to pivot, the tailgate pivots on the torque rod. Thus, the torque rod must be installed for the tailgate to pivot.

In the second case, the tailgate uses hinge pins and trunions for pivoting. However, the torque rod is assembled to the tailgate in a complex and intricate manner. For example, during assembly of the tailgate, the stationary end has to be aligned with an aperture on the lower edge of the tailgate while the anchoring end is aligned with a reinforcement plate located inside the tailgate. All of the aligning must be performed while the torque rod is deep within the interior of the tailgate. This procedure is too difficult for rapid assembly. Moreover, many additional elements are required to assemble the torque rod to the tailgate.

SUMMARY OF THE INVENTION

Accordingly, it is an object of the present invention to provide a tailgate hinge mechanism which permits the optional use and rapid installation of a torque rod to a closure member for assisting in opening and closing such member.

It is another object of the present invention to provide a hinge assembly for a closure member which is cooperative with a torque rod or torsion bar but may function independently of the torque spring to pivotally connect the closure member to a vehicle body while permitting removal of the closure member from the vehicle body. As a result of this arrangement, a torque rod assisted closure member such as a tailgate may be an optional accessory for a pickup truck that may be installed either at the assembly plant or by the vehicle dealer at the time of purchase of the vehicle or even subsequently as an after-market item.

In carrying out the above and other objects, hinge pins are mounted on the truck body at opposite ends of the tailgate opening and cooperating bushings on hinge brackets are fastened to opposite ends of the tailgate pivot on such hinge pins. One of the bushings has a transverse slot positioned to allow the tailgate to be lifted upwardly and thereby demounted from the truck body at one end when the tailgate is in a partially opened position. With one end demounted, the tailgate can be shifted endwise slightly and demounted at the other end. When a torque rod assisted tailgate is desired, one of the hinge brackets is fitted with a torque rod in a self-contained fashion which enables the hinge bracket/torque rod combination, or assembly, to be quickly and simply bolted in place at one end of the tailgate.

These and other features, aspects, and embodiments of the present invention will become better understood with reference to the following descriptions, appended claims, and accompanying drawings.

DESCRIPTION OF THE DRAWINGS

FIG. 3 is an exploded perspective view of a vehicle body hinge pin, tailgate, and a hinge bracket torque rod assembly according to the present invention for mounting at one end of a tailgate;

FIG. 4 is a perspective view of a unitary hinge bracket and a torque rod assembly ready for bolting in place to one end of a tailgate;

FIG. 8 is a cross-sectional view taken on the line 8—8 of FIG. 2 when the tailgate is in its closed position.

BEST MODES FOR CARRYING OUT THE INVENTION

Figure 1:
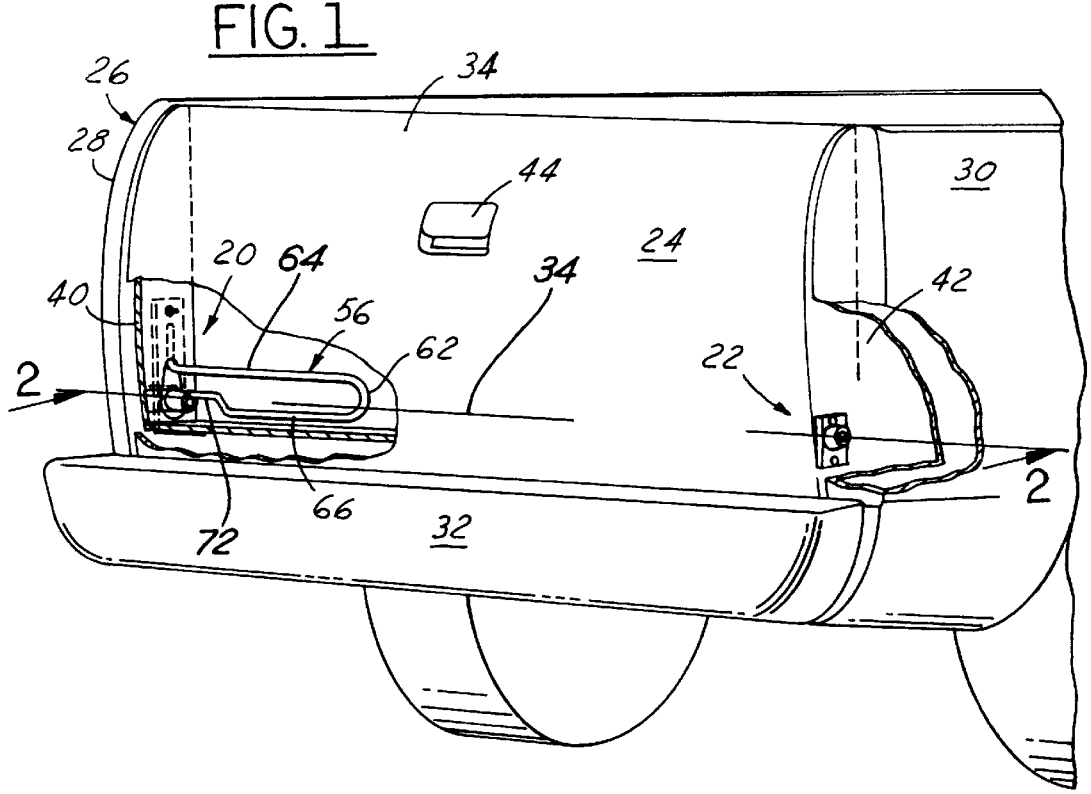
FIG. 1 is a perspective rear view of a truck body having a removable tailgate utilizing the invention with the tailgate in a closed position and showing it partially broken away and a hinge assembly in phantom.

Referring now to FIGS. 1, 2, 3 and 4, a pair of hinge assemblies 20 and 22 are shown. Hinge assemblies 20 and 22 pivotally connect a closure panel or member, such as a tailgate 24, to a vehicle body such as truck body 26. Truck body 26 has a pair of side panels 28 and 30 and a bumper 32. The hinge assemblies pivotally connect tailgate 24 to side panels 28 and 30 along a hinge axis 34. Tailgate 24 may be pivoted between horizontally opened and vertically closed positions. In the horizontally opened position (not shown), tailgate 24 is substantially horizontal and parallel with bumper 32. In the vertically closed position shown in FIG. 1, tailgate 24 is perpendicular to bumper 32 to form a rear panel adjacent side panels 28 and 30.

Tailgate 24 includes an inner panel 36 and an outer panel 38. Inner and outer panels 36 and 38 are connected by left and right end panels 40 and 42 and bottom panel 43. The panels of tailgate 24 define a hollow area within the tailgate. A handle 44 is connected to mechanism (not shown) that cooperates with the body side panels 28 and 30 to hold tailgate 24 in the closed position. An operator uses handle 44 to release tailgate 24 from the closed position and to lock the tailgate in the closed position in conventional fashion.

Hinge assemblies 20 and 22 are not identical as one, i.e., assembly 20 utilizes a torque rod while assembly 22 comprises a simple bushing 23 (see FIG. 2) telescoped over and rotatable on a pin 25. The bushing 23 is carried by a hinge bracket 23' attached to the end panel 42 of the tailgate, while pin 25 is carried by a bracket 25' attached to a confronting truck body side panel 30. After demounting the tailgate at hinge assembly 20 (as hereinafter described), the tailgate may simply be swung outwardly toward the operator, at the left end, and then shifted endwise to uncouple hinge assembly 22.

Hinge assembly 20 pivotally and removably connects the left end of tailgate 24 to the truck body 26 at side panel 28. Hinge assembly 20 includes an L-shaped hinge bracket 46 which mounts to end and bottom panels 40 and 43 of tailgate 24 with fasteners 47, thereby permitting the hinge bracket to be fastened or unfastened from the tailgate 24 quickly and easily.

Hinge bracket 46 is provided with a bushing 48 which is fixed to the bracket and extends through the bracket and is provided with a bore 49 which lies on or is coincident with the pivot axis 34 for the tailgate 24. The bore 49 of the bushing 48 cooperates with a vehicle body hinge pin 50 mounted on the vehicle side panel 28. The hinge pin 50 is configured to rotatably support the bushing thereon and in turn the tailgate 24 on which the hinge bracket is mounted. For this purpose, the hinge pin 50 includes a mounting plate portion 51 and a blade-like portion or tab 52 which is sized to be received through a bottom side-opening slot 53 in the bushing and enter the bore 49 of the bushing and rotatably support the bushing thereon as best shown in FIGS. 3 and 8.

The tailgate 24 is mounted on the truck body by holding it at about 15° from its vertically closed position and aligning the slot 53 with the tab 52. The tab will enter the bushings 48 to provide support for rotatable movement of the tailgate on the truck body.

Figure 2:
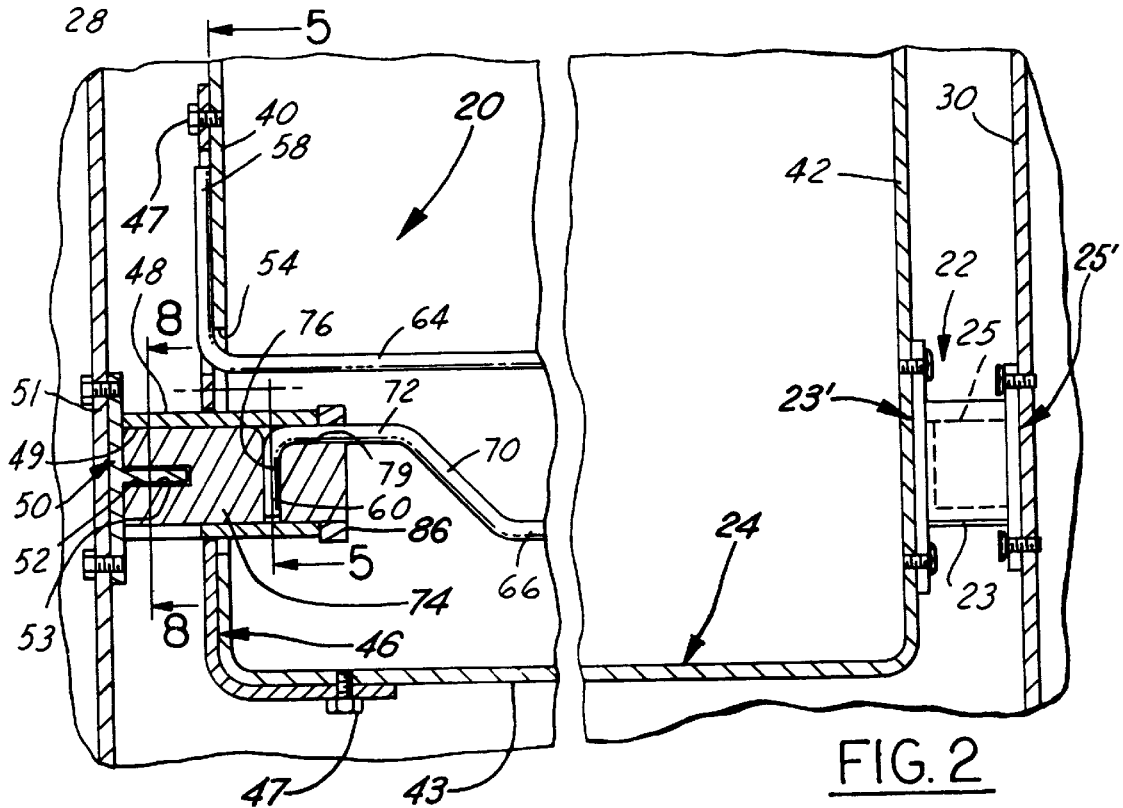
FIG. 2 is a view partially in section taken substantially along the line 2—2 of FIG. 1.
Figure 5:
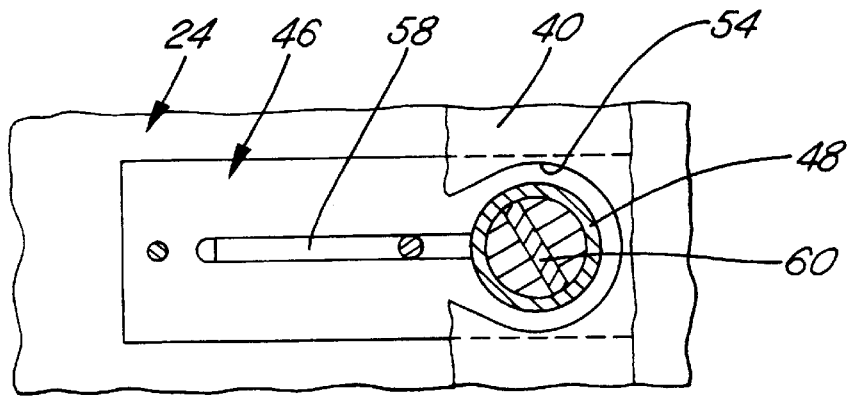
FIG. 5 is a view partially in section taken along the line 5—5 of FIG. 2 showing the arms of the torque rod when the tailgate is in the horizontally opened position.
Figure 6:
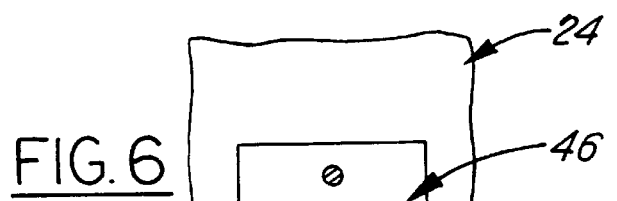
FIG. 6 is a view partically in section and similar to FIG. 5 showing the arms of the torque rod when the tailgate is in the vertically closed position.

As best shown in FIGS. 2, 3 and 4, a torsion bar or torque rod 56 of generally U-shaped configuration is adapted to cooperate with the hinge bracket 46 and the tailgate to assist in supporting the weight of the tailgate as it is moved from the fully opened position represented in FIG. 5 to the fully closed position shown in FIGS. 1 and 6. The torque rod has a bight portion 62 and a pair of parallel leg portions 64 and 66 with the former terminating in a crank arm 58 and the latter in an angle portion 70, a longitudinally extending portion 72, and an angularly disposed crank end 60. The major portion, namely the bight 62, and portions 64, 66, 70 and 72, are received through an access opening 54 in the end panel 40 (42 in FIG. 3) of the tailgate to be disposed as shown in FIG. 2. A connecting pin 74 is sized to be a slip-fit within the bushing 48. The pin 74 is provided with a transverse slot 84 intended to cooperate with the tab 52 whereby the pin 74 is held against rotation in fixed relation with the truck body. The opposite end of the pin 74 is provided with a shallow slot 79 and a transverse bore 76 to receive the ends 60 and 72 of the torque rod 56 so that the pin and rod may be inserted within the bushing 50 as best shown in FIG. 2. A retaining ring 86 may be press-fitted over the end of the pin 74 to hold the torque rod and pin together.

The crank end or crank arm 58 of the torque rod nests within the slot 68 of hinge bracket 46 (see FIG. 4) when the bracket is secured to the end panel 40 of the tailgate. The crank end 58 overlies the end wall 40 (or 42 as shown in FIG. 3) and nests within the slot 68 as shown in FIG. 4. Thus, one crank end of the torque rod is locked to and moves with the tailgate while the opposite end 60 is fixed in relation to the truck body through the pin 74.

It will now be apparent that the torque rod 56 is not disturbed nor does it require any special fitting of the rod ends into portions of the truck body when the tailgate is installed or removed from the body, as is the case with the prior art. In addition, the torque rod is so constructed and arranged that it holds the pin 74 in a position such that the slot 84 is properly aligned to be received over the tab 52 when the tailgate is mounted on the vehicle body. Thus, the torque rod will position slot 84 in alignment with the bottom side opening slot 53 in the hinge bracket bushing 48 in a position for reception over the tab 52. Thus, the tailgate may be placed on or removed from the truck body without any complication arising from the torque rod assisted nature of the mounting.

As will be apparent from the foregoing description, the torque rod 56 may be eliminated from the assembly and the hinges will still function to support the tailgate for pivotal movement on the truck body. Thus, the torque rod becomes an option. The purchaser of the vehicle may either order a truck body with an assisted or unassisted tailgate. This option is of sufficiently simple construction and arrangement that a new car dealer may readily offer the tailgate assist feature as an option to the new truck buyer, or even as an after-market accessory for pre-owned vehicles.

Figure 7:
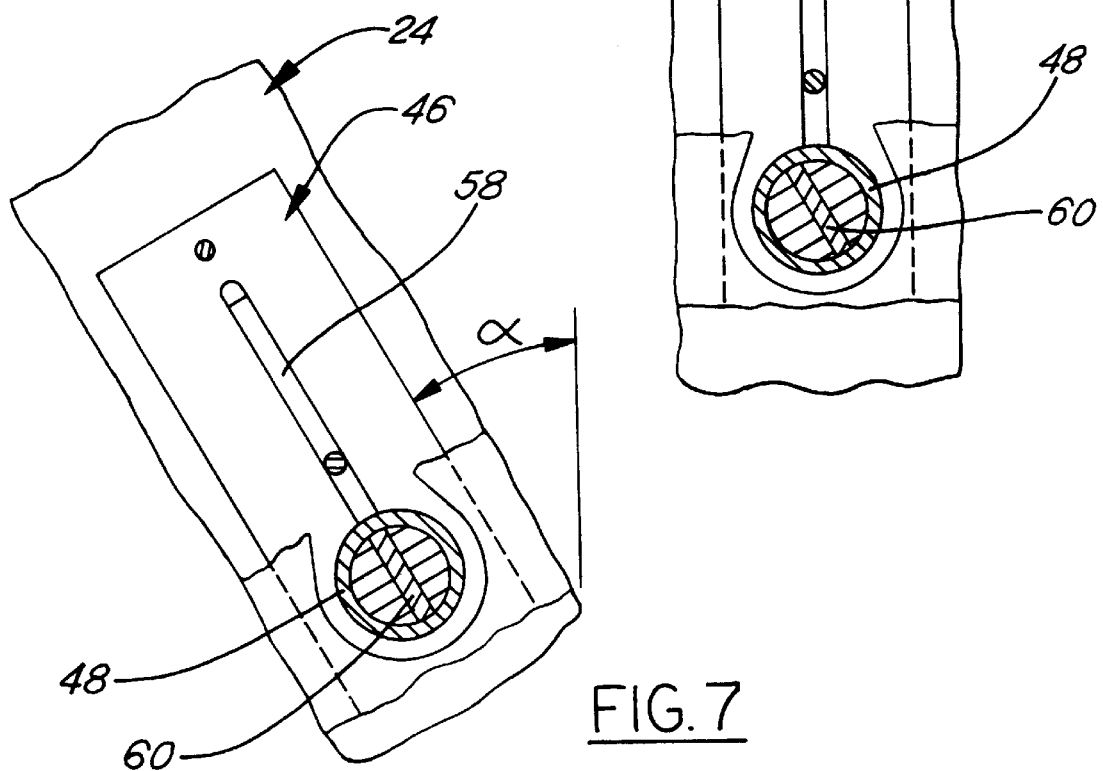
FIG. 7 is a view partically in section and similar to FIG. 5 showing the arms of the torque spring when the tailgate is in the tailgate removal position.

In operation, torque rod 56 twists in torsion from a completely unwound position as tailgate 24 pivots. Once twisted and wound up, torque rod 56 continuously applies a force to untwist back to the unwound position. The unwound position of torque spring 56 occurs at the tailgate removal position. Preferably, the tailgate removal position is set at an angle between the opened and closed positions of tailgate 24 (shown as the angle alpha in FIG. 7). As shown in FIG. 7, the angle alpha of the tailgate removal position is around 10 to 20 degrees offset from the vertically closed position of tailgate 24. Under these circumstances, when tailgate 24 is in the closed position, torque rod 56 applies an untwisting opening force to pop open the tailgate when it is released by handle 44. Also, in the closed position, torque rod 56 urges tailgate 24 against a latch mechanism (not shown) so that vibration and rattling of the tailgate during operation is reduced. Similarly, when tailgate 24 is in the horizontally opened position, torque rod 56 applies an untwisting closing force to assist an operator in closing the tailgate.

The size and diameter of torque rod 56 may be varied depending on the amount of force desired. Preferably, the amount of force is approximately equal to the weight of tailgate 24 so that the tailgate maintains the parallel position relative to bumper 32 in the horizontally opened position when free of other forces.

It should be noted that the present invention may be used in a variety of different constructions encompassing many alternatives which will become apparent to those of ordinary skill in the art. Accordingly, the present invention is intended to embrace all such alternatives, modifications, and variations that fall within the spirit and broad scope of the appended claims. For example, although the present invention has been illustrated with a tailgate on a truck body, it is equally applicable to other removable closure panels hingedly mounted to other bodies.

What is claimed is:

1. Mechanism for removably mounting a closure member between spaced apart body side panels of a vehicle body for pivotal movement about a pivotal axis between open, closed and removal positions comprising, in combination:

hinge brackets adapted to be secured to opposite ends of the closure member with each of said hinge brackets having a bushing thereon whose axis is coincident with the axis of pivotal movement of the closure member;

a vehicle body hinge pin for mounting on each of the spaced apart body side panels coincident with the axis of pivotal movement of the closure member and configured to rotatably support said bushing thereon and in turn said closure member on which the hinge brackets are mounted;

one of said bushings having a laterally opening slot therein positioned circumaxially to permit the bushing to be received laterally downwardly over said vehicle body hinge pin when the closure member is in the removal position;

a connecting pin journaled within said one bushing and having a first end laterally slidably connected in driving engagement with said vehicle body hinge pin in said one bushing and having a second end for driving engagement with a torque rod; and said torque rod having one end connected in driving engagement to one of said hinge brackets on which is said one bushing and the opposite end connected in driving engagement with said second end of the connecting pin;

whereby said torque rod is twisted in tension when the closure member is pivoted to either the closed or open positions from the removal position, thereby providing a counterbalancing effort to assist with pivotal movement of the closure member, and yet permit facile removal of the closure member from the vehicle body when the closure member is in the removal position.

2. The mechanism defined by claim 1 wherein said torque rod is of U-shaped configuration and one end is connected in driving engagement with one of said hinge brackets and the opposite end is connected in driving engagement with said connecting pin journalled in the bushing on one of said hinge brackets.

3. The mechanism of claim 1 wherein said second end of the connecting pin has a transverse bore disposed within the interior of said bushing, and the connected end of the torque rod has a bent end disposed in said transverse bore to effect a driving engagement between said hinge pin and torque rod.

4. The mechanism defined by claim 1 wherein one of said hinge brackets, said connecting pin and said torque rod, comprise a unitary assembly mountable as a unit on said closure member; and wherein said torque rod and connecting pin are optionally provided in such assembly whereby one of said hinge brackets may be utilized alone to mount said closure member on said vehicle body where torque assistance is not required.

5. The mechanism of claim 1 wherein said connecting pin has a diameter sized to support the connecting pin for rotation within the bushing.

6. The mechanism defined by claim 5 wherein said vehicle body hinge pin has a blade-like portion sized to slidably fit transversely through said slot in said bushing and enter a slot in the connecting pin to effect a driving engagement therebetween.

7. The mechanism defined in claim 1 wherein said vehicle body hinge pin has a blade-like portion sized to slidingly fit transversely through said slot in said bushing and enter a bore in the bushing to support one of said hinge brackets and said closure member on which the bracket is mounted for pivotal movement on the hinge pin.

8. Mechanism for removably mounting a closure member between spaced apart body side panels of a vehicle body for movement about a pivotal axis between open, closed and removal positions comprising, in combination:

hinge brackets adapted to be secured to opposite ends of the closure member with each of said hinge brackets having a bushing thereon whose axis is coincident with the axis of pivotal movement of said closure member;

a vehicle body hinge pin for mounting on each of the spaced apart body side panels coincident with the axis of pivotal movement of the closure member, and configured to rotatably support said bushing thereon, and in turn said closure member on which the hinge brackets are mounted;

at least one of said bushings having a laterally opening slot therein positioned circumaxially to permit the bushing to be received laterally downwardly over said vehicle body hinge pin when the closure member is in the removal position;

a torque rod having one end connected in driving engagement to said hinge bracket and the opposite end adapted for connecting the torque rod in driving engagement with said vehicle body hinge pin within the bushing and independently of the rotatable support of the bushing on the hinge pin; and said torque rod being twisted in tension when the closure member is pivoted to either the closed or open positions from the removal position, thereby providing a counterbalancing effort to assist with pivotal movement of the closure member, and yet permit facile removal of the closure member from the vehicle body when the closure member is in the removal position.

9. A torque rod assembly for use with a tailgate adapted for pivotal mounting on vehicle body hinge pins comprising, in combination:

a tailgate hinge bracket for mounting on an end of said tailgate;

one of said bushing on the tailgate bracket having a bore therethrough for disposition on the pivotal axis of said tailgate on which the bracket is mounted, and a side opening slot communicating with the bore to allow the bushing to be received laterally over said vehicle body hinge pin to rotatably support the hinge bracket, and in turn said tailgate on which the bracket is mounted, on such vehicle body hinge pin;

a torque rod of generally U-shaped configuration anchored at one end to the hinge bracket and having the opposite end disposed in said bushing for driving engagement with said vehicle body hinge pin upon which the bushing is pivotally received; and said pivotal support of the bushing on the hinge pin being independent of said torque rod.

* * * * *